Dec. 12, 1967    D. JOURDAN    3,357,510
SYSTEM FOR ENABLING MOTOR VEHICLES TO CLIMB OBSTACLES
Filed March 2, 1965    4 Sheets-Sheet 1
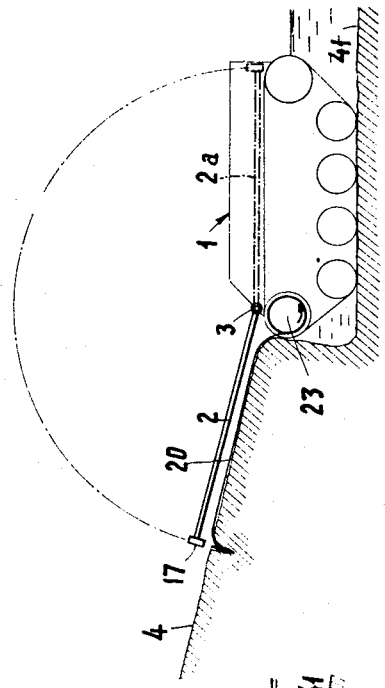
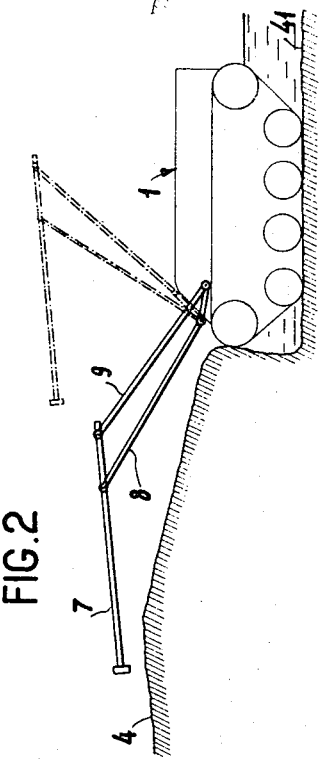
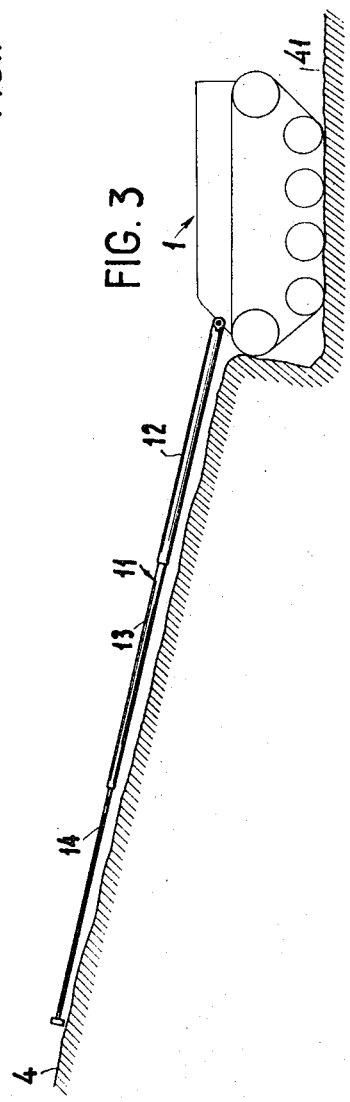

Dec. 12, 1967  D. JOURDAN  3,357,510
SYSTEM FOR ENABLING MOTOR VEHICLES TO CLIMB OBSTACLES
Filed March 2, 1965  4 Sheets-Sheet 2
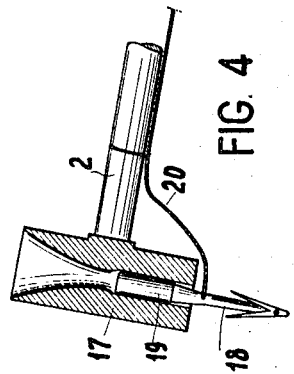
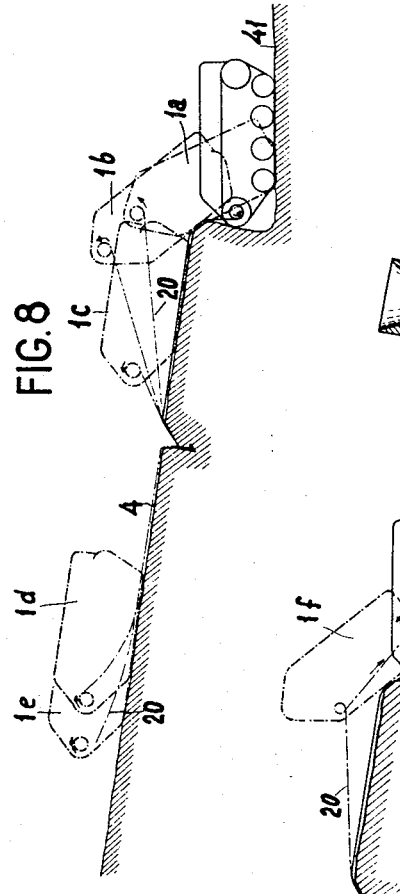
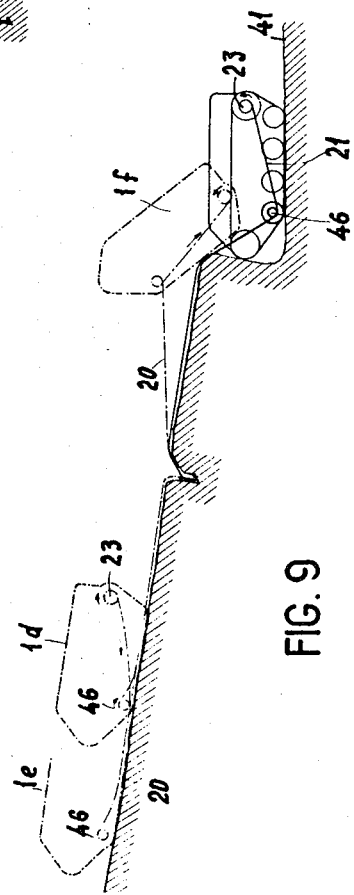

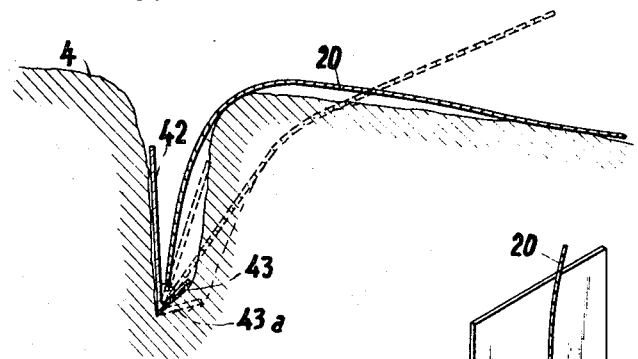
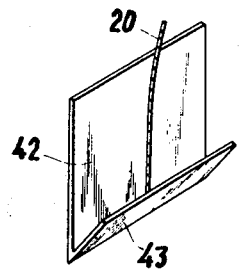
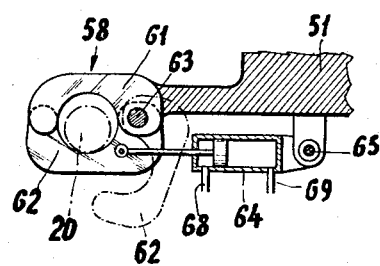
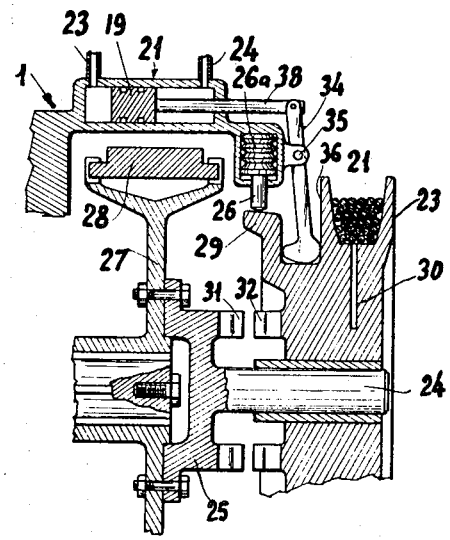

United States Patent Office 3,357,510
Patented Dec. 12, 1967

3,357,510
SYSTEM FOR ENABLING MOTOR VEHICLES TO CLIMB OBSTACLES
Daniel Jourdan, 63 Rue Victor Hugo,
Puteaux, France
Filed Mar. 2, 1965, Ser. No. 436,622
Claims priority, application France, Mar. 5, 1964,
966,227
10 Claims. (Cl. 180—7)

The invention has for its object to provide a device adapted to enable a vehicle such as a tank, an armored car, a self-propelled gun or an amphibious vehicle to climb over an obstacle by its own means, and more particularly climb up the slope of an inclination and/or configuration of such a nature that the conventional propelling means of the vehicle does not permit such mobile action.

The device according to the invention, comprises in combination, at least one arm articulated on the vehicle, means to bring the extremity of the arm on to a point situated ahead of the vehicle, at least one winch mounted on the vehicle, at least one cable wound on the winch and the free extremity of which is carried by the extremity of the arm, means for securing such extremity of the cable to the point on the ground above which the extremity of the arm has been positioned, and means to exercise, with the cable, by means of the propelling means of the vehicle, a traction force at a point on the lower forepart of the vehicle in such a manner as to bring the latter in to the desired position for it to climb over the obstacle by being drawn by the cable over said obstacle.

By means of this device, when a tank or any other vehicle, after having crossed a river, reaches an abrupt bank, the vehicle can climb the bank by its own means by being equipped with two cables which can be anchored in the ground ahead of the vehicle and on which the vehicle can exercise traction so as to be brought into such a position that it can continue to move normally on its tracks or wheels.

The means adapted to render the free extremity of the cable solidly anchored in the ground consist of an anchoring component fixed to the extremity of the cable and equipped with an explosive charge and carried by the free extremity of the arm so that the anchoring component and the extremity of the cable are projected and driven into the ground by the explosion of the charge.

In one form of application, each winch is mounted freely on a shaft on a track drive wheel or on a drive sprocket wheel and is provided with disconnectible means for coupling the winch to the corresponding wheel or sprocket.

Further objects and advantages of the invention will become more readily apparent to persons skilled in the art from the following detailed description and annexed drawings and in which drawings:

FIG. 1 is a side view of a tank equipped with a device according to the invention adapted to enable the tank to climb over an obstacle, FIGS. 2 and 3 are views showing two modifications of the arm for anchoring in the free extremity of the cable, FIG. 4 is a view in section, on a larger scale, of a cable anchoring device carried by the arm, FIG. 5 is a view in perspective of a modification of the cable anchoring device shown in FIG. 4.

FIG. 6 is a view showing in section a cable winding winch assembly,

FIG. 7 is a view showing the extremity of a cable anchored in the ground,

Figure 13:
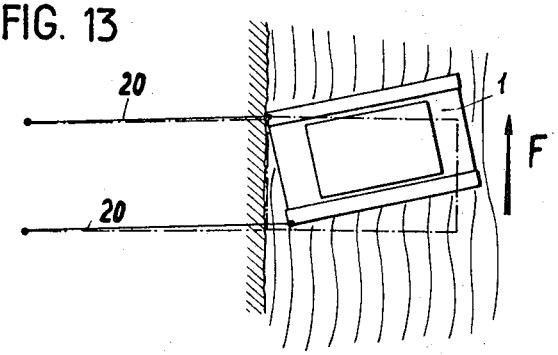
Figure 10:
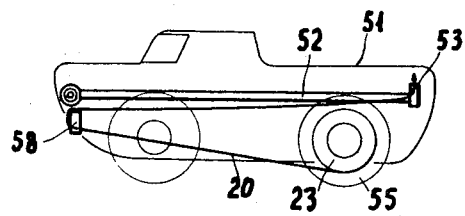
Figure 11:
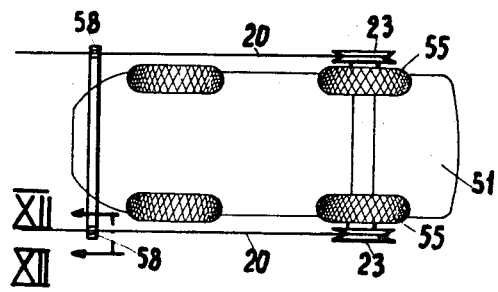
Figure 14:
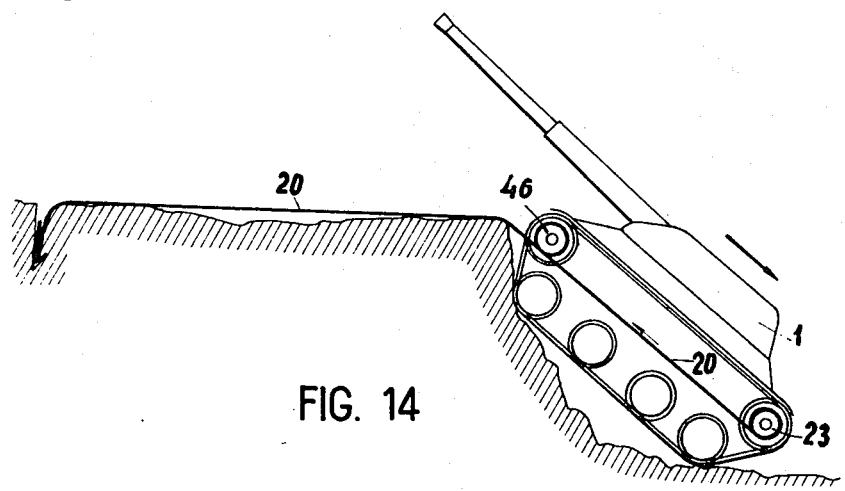

FIG. 8 is a view illustrating the successive phases of a tank climbing over an obstacle with the track drive sprocket wheels of the tank being located in the front thereof, FIG. 9 is a view corresponding to FIG. 8 for a tank in which the track drive sprocket wheels are at the rear, FIGS. 10 and 11 are views schematically representing in elevation and plan respectively, an amphibious wheeled vehicle provided with a device according to the invention, FIG. 12 is a view taken along the line XII—XII of FIG. 11, FIG. 13 is a view schematically shown in plan the use of the differential on the tank to overcome the current when crossing a river, and FIG. 14 is a view showing the manner in which the present device can be used to enable a tank to climb down an abrupt obstacle.

The tank 1 is equipped with an arm 2 which can pivot on a transverse horizontal spindle 3 and which can, for example, be swung to the position shown in dotted lines 2a. This arm is so designed and arranged that its free extremity can come into contact with ground 4 forward or ahead of the tank. As an alternative, in FIG. 2, arm 7 is carried by a system of articulated levers 8, 9 which make it possible to gain a greater reach or extension than that disclosed in FIG. 1, and in FIG. 3, a telescopic arm 11 consisting of several components 12, 13, 14 achieve the same ends.

The free extremity of the moving arm such as the arm 2 in FIG. 1 is equipped with an assembly 17 (see also FIG. 4) designed to receive an anchoring system 18 for anchoring in the ground and provided with an explosive charge 19. To the anchoring system 18 is attached the free extremity of a cable 20 of great strength which runs along the arm 2 and which winds on to the drum of a winch mounted on the vehicle. This winch can be driven, for example, by an independent motor or by the engine of the vehicle.

In the example shown, the drum of winch 23 (FIGS. 6 and 9) is mounted free on an overhanging shaft 24 by a stub axle 25 against the exterior face of the web of a drive sprocket wheel for a tank track 28.

Drum 23 can be coupled to a sprocket wheel 27 by means of a coupling, such as dog teeth 31, 32 which can be engaged or disengaged at will by having the drum slide axially along the shaft 24 by means of a lever 34 pivoted on an intermediate pin 35, with one extremity of the lever being housed in an annular groove 36 in the winch drum and the other extremity connected to rod 38 of piston 39 of a double-acting hydraulic actuator 21 wherein the oil inlet and outlet ports have been indicated at 22 and 24.

The drum 23 is constantly braked by an elastic system 26a constituted by a simple thrust spring arranged to urge piston rod 26 into frictional engagement with a rim 29 which is so tapered that the rod is out of engagement with the rim 29 when the drum 23 is clutched to the wheel 27. Hence, the coils of the cable 20 wound on to the drum are prevented from slackening, jumping the drum and entangling during operation. The extremity of that part of the cable wound onto the drum is preferably engaged in a round hole 30 in the latter.

The device operates as follows:

It will be assumed that the track drive sprocket wheels are at the front of the tank as shown in FIGS. 1 and 8. The anchoring system 18 and its explosive charge 19 are in place in assembly 17 fixed to arm 2 and the cable 20 fixed to this anchoring device. The arm 2 is operated so that the anchoring device strikes the ground 4 at a point ahead of the tank such as on the bank of a river 41 which the tank has just crossed. The explosive charge 19 forces the anchoring system 18 into the ground together with the extremity of the cable 20 attached thereto, as shown in FIGS. 7 and 8. Spike 18 may be replaced by a plate 42 (see FIG. 5) having a folded edge 43 which jams in the ground as indicated at 43a under the effect of the traction of the cable.

Preferably, a cable system such as that described has been provided on each side of the tank as shown in FIG. 13 in such a manner that the tank can be pulled parallel to itself and, if necessary, so as to be able to take the effect of the exterior forces into account such as force F of the current of the river, by using the differential provided in the drive system of the tank.

Oil is forced under pressure into pipe 22 of the hydraulic actuator 21 so that the drum on which 23 engages sprocket wheel 27. The track drive is engaged as though the tank were to advance normally in such a manner that the rotation of the two winch drums causes a winding of the cables 20 anchored in the ground and, as a result, the raising of the front part of tank 1a (FIG. 8. The tank continues up to its balancing position 1b against the crest of the bank, after which it returns to the normal inclination as indicated at 1c, and, from this moment, it can progress normally over the ground. At the moment when the front of the tank crosses the anchoring points of the cables in the ground, the winch 23 is disengaged by oil being forced under pressure into pipe 24 of the hydraulic actuator 21. The cables unwind freely as indicated for example for position 1d of the tank and, finally, when the cables are completely unwound from the winches they fall onto the ground, which corresponds to position 1e of the tank in FIG. 8 and are abandoned while the tank continues its progress.

If the track drive sprocket wheels of the tank are at the rear as shown in FIG. 9 in which a drum for the winch 23 has been shown, it is advisable to pass each cable 20 through a guide situated on the lower fore part of the tank. The guide consists of, for example, a loose pulley 46 mounted on a track roller. There is of course a loose pulley on each side of the tank for the guidance of both traction cables. In order to prevent the tank from running the risk of rocking over backwards while it is negotiating the obstacle, it is advisable to take a turn of the cable 20 about the loose pulley 46 as shown at 1f in FIG. 9. Aside from this difference, the device is used in the same manner as when the drive sprockets are at the front. The cable then unwinds itself first from drum 23 and than from loose pulley 46 as shown as positions 1d and 1e.

In FIGS. 10 and 11 there is disclosed the application of the same principle to an amphibious vehicle 51 which is provided with an arm 52 having an anchoring assembly 53. Drums 23 are mounted on drive wheels 55 and can, at will, be coupled to the latter by means of a controlled coupling. The cables 20 each pass through a guide 58 (see FIG. 12) which consists of a stationary plate 61 and a plate 62 adapted to pivot on a pin 63 under the action of a hydraulic actuator 64, the cylinder of which is articulated on a pin 65 carried by the chassis of vehicle 51. As fluid is transmitted under pressure into pipe 68 or pipe 69 of the actuator, guide 58 opens or closes.

The use of the device on such as amphibious vehicle is the same as for a tank provided with the rear sprocket drive of FIG. 9, with this difference that the cables instead of passing through the loose guide pulleys 58 pass through the guides 58 which are opened at the moment of their passage over the anchoring points of the cables in the ground.

FIG. 14 shows the manner in which the same device can be used to enable the tank 1 to more easily negotiate an abrupt drop. Cable 20 can be seen unwinding from the winch 23, passing onto a loose pulley 46 while the tracks are driven in a direction which urges the tank to climb in a downward direction.

The invention is not to be confined to any strict conformity to the showings in the drawings but changes or modifications may be made therein so long as such changes or modifications mark no material departure from the spirit and scope of the appended claims.

I claim:

1. A system for enabling a motor vehicle having a motor to climb obstacles, said system comprising, in combination, at least one arm articulated on the vehicle, means to bring the extremity of the arm to a point situated ahead of the vehicle, at least one winch mounted on the vehicle, at least one cable wound on the winch and the free extremity of which is carried by the forementioned arm, means for anchoring said cable extremity to the point in the ground over which the extremity of said arm has been brought, a controllable drive connection between said motor and said winch for operating the winch to pull on the cable after anchoring of said extremity thereof and to exert traction at a point on the lower fore part of the vehicle in such a manner as to bring the vehicle to the desired position for the vehicle to climb over the obstacle by being drawn by the cable onto said obstacle.

2. The system according to claim 1, wherein each arm pivots on a horizontal spindle situated on the upper fore part of the vehicle.

3. The system according to claim 1, wherein each arm is carried by a system of levers articulated on the upper fore part of the vehicle.

4. The system according to claim 1, wherein each arm is telescopic.

5. The system according to claim 1, in which said anchoring means comprise a stake member secured to said extremity of the cable, equipped with an explosive charge and carried by the free extremity of the arm, in such a manner that said member and the extremity of the cable are projected and driven into the ground by the explosion of the charge.

6. The system according to claim 1, wherein each winch is mounted free on a shaft carried by drive wheel means and is equipped with disconnectable devices for coupling said winch to said drive wheel.

7. The system according to claim 6, wherein each winch is mounted on the drive wheel means situated in the fore part of the vehicle.

8. The system according to claim 6, wherein each winch is mounted on the drive wheel means situated at the rear of the vehicle, and said vehicle further including a passage guide for each cable at the lower fore part of the vehicle.

9. The system according to claim 8, wherein each guide consists of a loose pulley.

10. The system according to claim 8, wherein each guide includes a movable component adapted to open and close the guide and control means operably related to the movable component adapted to open and to close said movable component.

References Cited

UNITED STATES PATENTS

| 1,054,831 | 3/1913 | De Peel | 242—95 X |
| 1,080,653 | 12/1913 | Pillsbury | 242—95 |
| 2,240,570 | 5/1941 | Oesterheld | 242—95 X |
| 2,490,378 | 12/1949 | Mount | 89—1 X |
| 2,522,685 | 9/1950 | Mount | 89—1 X |

LEO FRIAGLIA, *Primary Examiner.*